United States Patent
Chuang et al.

(10) Patent No.: US 10,511,835 B2
(45) Date of Patent: Dec. 17, 2019

(54) METHOD AND APPARATUS OF DECODER SIDE MOTION DERIVATION FOR VIDEO CODING

(71) Applicant: MEDIATEK INC., Hsinchu (TW)

(72) Inventors: Tzu-Der Chuang, Zhubei (TW); Ching-Yeh Chen, Taipei (TW); Chih-Wei Hsu, Hsinchu (TW); Yu-Wen Huang, Taipei (TW); Jian-Liang Lin, Su'ao Township (TW); Yu-Chen Sun, Keelung (TW); Yu-Ting Shen, Taichung (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/754,721

(22) PCT Filed: Sep. 2, 2016

(86) PCT No.: PCT/CN2016/097853
§ 371 (c)(1),
(2) Date: Feb. 23, 2018

(87) PCT Pub. No.: WO2017/036414
PCT Pub. Date: Mar. 9, 2017

(65) Prior Publication Data
US 2018/0249154 A1  Aug. 30, 2018

Related U.S. Application Data

(60) Provisional application No. 62/213,257, filed on Sep. 2, 2015.

(51) Int. Cl.
*H04N 19/105* (2014.01)
*H04N 19/52* (2014.01)
(Continued)

(52) U.S. Cl.
CPC ......... *H04N 19/105* (2014.11); *H04N 19/176* (2014.11); *H04N 19/52* (2014.11); *H04N 19/567* (2014.11); *H04N 19/57* (2014.11)

(58) Field of Classification Search
CPC .. H04N 19/139; H04N 19/157; H04N 19/174; H04N 19/48; H04N 19/513;
(Continued)

(56) References Cited

U.S. PATENT DOCUMENTS 6,594,313 B1 * 7/2003 Hazra ................. H04N 7/014
348/E7.013
2013/0329007 A1  12/2013 Zhang et al.
(Continued)

FOREIGN PATENT DOCUMENTS

CN 104488272 A 4/2015

OTHER PUBLICATIONS

International Search Report dated Nov. 25, 2016, issued in application No. PCT/CN2016/097853.
(Continued)

*Primary Examiner* — Dominic D Saltarelli
(74) *Attorney, Agent, or Firm* — Oblon, McClelland, Maier & Neustadt, L.L.P.

(57) ABSTRACT

Method and apparatus of video coding using decoder derived motion information based on bilateral matching or template matching are disclosed. According to one method, an initial motion vector (MV) index is signalled in a video bitstream at an encoder side or determined from the video bitstream at a decoder side. A selected MV is then derived using bilateral matching, template matching or both to refine an initial MV associated with the initial MV index. In another method, when both MVs for list 0 and list 1 exist in template matching, the smallest-cost MV between the two MVs may be used for uni-prediction template matching if
(Continued)

the cost is lower than the bi-prediction template matching. According to yet another method, the refinement of the MV search is dependent on the block size. According to yet another method, merge candidate MV pair is always used for bilateral matching or template matching.

19 Claims, 8 Drawing Sheets

(51) Int. Cl.
*H04N 19/176* (2014.01)
*H04N 19/567* (2014.01)
*H04N 19/57* (2014.01)

(58) Field of Classification Search
CPC ...... H04N 19/56; H04N 19/105; H04N 19/52; H04N 19/176; H04N 19/567; H04N 19/57
USPC .......................... 375/240.14, 240.15, 240.16
See application file for complete search history.

(56) References Cited

U.S. PATENT DOCUMENTS

| | | | |
|---|---|---|---|
| 2014/0169472 A1 | 6/2014 | Fludkov et al. | |
| 2014/0301463 A1* | 10/2014 | Rusanovskyy | H04N 19/52 375/240.14 |
| 2014/0301467 A1 | 10/2014 | Thirumalai et al. | |
| 2015/0319453 A1* | 11/2015 | Kang | H04N 19/30 375/240.12 |
| 2016/0191928 A1* | 6/2016 | Lee | H04N 19/30 375/240.02 |

OTHER PUBLICATIONS

Chen, J., et al.; "Further improvement to HMKTA-1.0;" ITU-Telecommunications Standardization Sector; Jun. 2015; pp. 1-8.
Kamp, S., et al.; "Decoder side motion vector derivation for inter frame video coding;" IEEE; Oct. 2008; pp. 1120-1123.

* cited by examiner

METHOD AND APPARATUS OF DECODER SIDE MOTION DERIVATION FOR VIDEO CODING

CROSS REFERENCE TO RELATED APPLICATIONS

The present invention claims priority to U.S. Provisional Patent Application Ser. No. 62/213,257, filed on Sep. 2, 2015. The U.S. Provisional Patent Applications are hereby incorporated by reference in their entireties.

TECHNICAL FIELD

The present invention relates to motion compensation for video coding using decoder side derived motion information. In particular, the present invention relates to improving performance or reducing complexity of merge motion vector derivation using the bilateral matching and/or template matching techniques.

BACKGROUND

In a typical video coding system utilizing motion-compensated Inter prediction, motion information is usually transmitted from an encoder sider to a decoder so that the decoder can perform the motion-compensated Inter prediction correctly. In such systems, the motion information will consume some coded bits. In order to improve coding efficiency, a decoder-side motion vector derivation method is disclosed in VCEG-AZ07 (Jianle Chen, et al., *Further improvements to HMKTA-1.0*, ITU—Telecommunications Standardization Sector, Study Group 16 Question 6, Video Coding Experts Group (VCEG), $52^{nd}$ Meeting: 19-26 Jun. 2015, Warsaw, Poland). According to VCEG-AZ07, the decoder-side motion vector derivation method uses two Frame Rate Up-Conversion (FRUC) Modes. One of the FRUC modes is referred as bilateral matching for B-slice and the other of the FRUC modes is referred as template matching for P-slice or B-slice.

Figure 1:
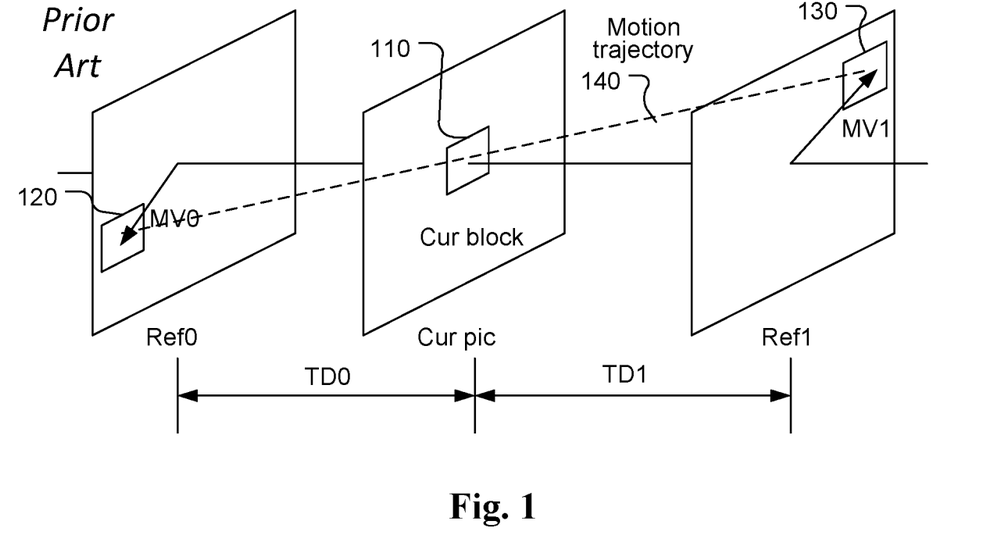
FIG. 1 illustrates an example of motion compensation using the bilateral matching technique, where a current block is predicted by two reference blocks along the motion trajectory.

FIG. 1 illustrates an example of FRUC bilateral matching mode, where the motion information for a current block 110 is derived based on two reference pictures. The motion information of the current block is derived by finding the best match between two blocks (120 and 130) along the motion trajectory 140 of the current block in two different reference pictures (i.e., Ref0 and ref1). Under the assumption of continuous motion trajectory, the motion vectors MV0 associated with ref0 and MV1 associated with Ref1 pointing to the two reference blocks shall be proportional to the temporal distances, i.e., TD0 and TD1, between the current picture (i.e., Cur pic) and the two reference pictures.

Figure 2:
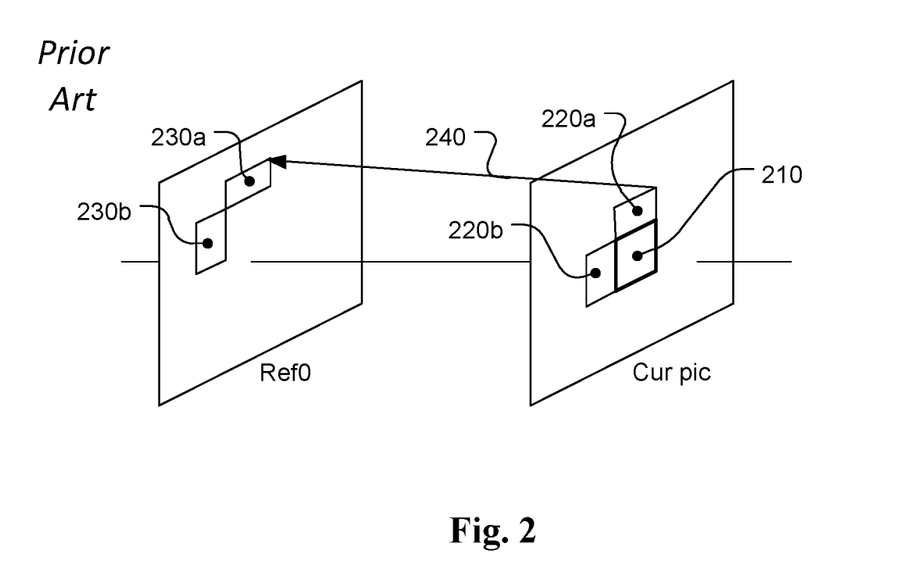
FIG. 2 illustrates an example of motion compensation using the template matching technique, where the template of the current block is matched with the reference template in a reference picture.

FIG. 2 illustrates an example of template matching FRUC mode. The neighbouring areas (220a and 220b) of the current block 210 in a current picture (i.e., Cur pic) are used as a template to match with a corresponding template (230a and 230b) in a reference picture (i.e., Ref0). The best match between template 220a/220b and template 230a/230b will determine a decoder derived motion vector 240. While Ref0 is shown in FIG. 2, Ref1 can also be used as a reference picture.

According to VCEG-AZ07, a FRUC_mrg_flag is signalled when the merge_flag or skip_flag is true. If the FRUC_mrg_flag is 1, then FRUC_merge_mode is signalled to indicate whether the bilateral matching merge mode or template matching merge mode is selected. If the FRUC_mrg_flag is 0, it implies that regular merge mode is used and a merge index is signalled in this case. In video coding, in order to improve coding efficiency, the motion vector for a block may be predicted using motion vector prediction (MVP), where a candidate list is generated. A merge candidate list may be used for coding a block in a merge mode. When the merge mode is used to code a block, the motion information (e.g. motion vector) of the block can be represented by one of the candidates MV in the merge MV list. Therefore, instead of transmitting the motion information of the block directly, a merge index is transmitted to a decoder side. The decoder maintains a same merge list and uses the merge index to retrieve the merge candidate as signalled by the merge index. Typically, the merge candidate list consists of a small number of candidates and transmitting the merge index is much more efficient than transmitting the motion information. When a block is coded in a merge mode, the motion information is "merged" with that of a neighbouring block by signalling a merge index instead of explicitly transmitted. However, the prediction residuals are still transmitted. In the case that the prediction residuals are zero or very small, the prediction residuals are "skipped" (i.e., the skip mode) and the block is coded by the skip mode with a merge index to identify the merge MV in the merge list.

While the term FRUC refers to motion vector derivation for Frame Rate Up-Conversion, the underlying techniques are intended for a decoder to derive one or more merge MV candidates without the need for explicitly transmitting motion information. Accordingly, the FRUC is also called decoder derived motion information in this disclosure. Since the template matching method is a pattern-based MV derivation technique, the FRUC technique is also referred as Pattern-based MV Derivation (PMVD) in this disclosure.

Figure 3A:
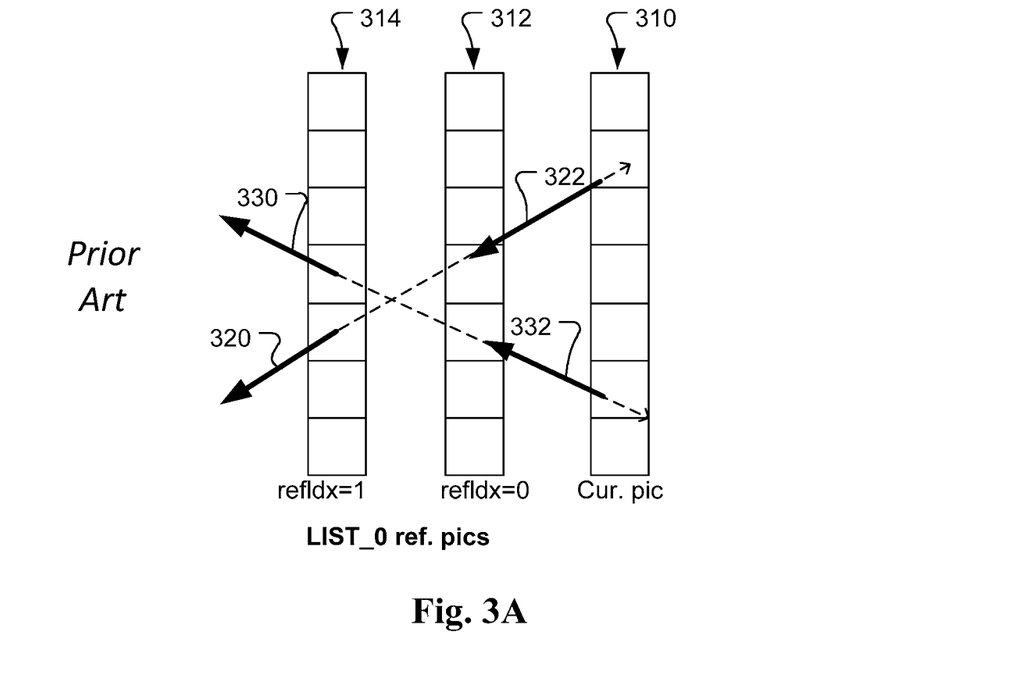
FIG. 3A illustrates an example of temporal motion vector prediction (MVP) derivation process for LIST_0 reference pictures.
Figure 3B:
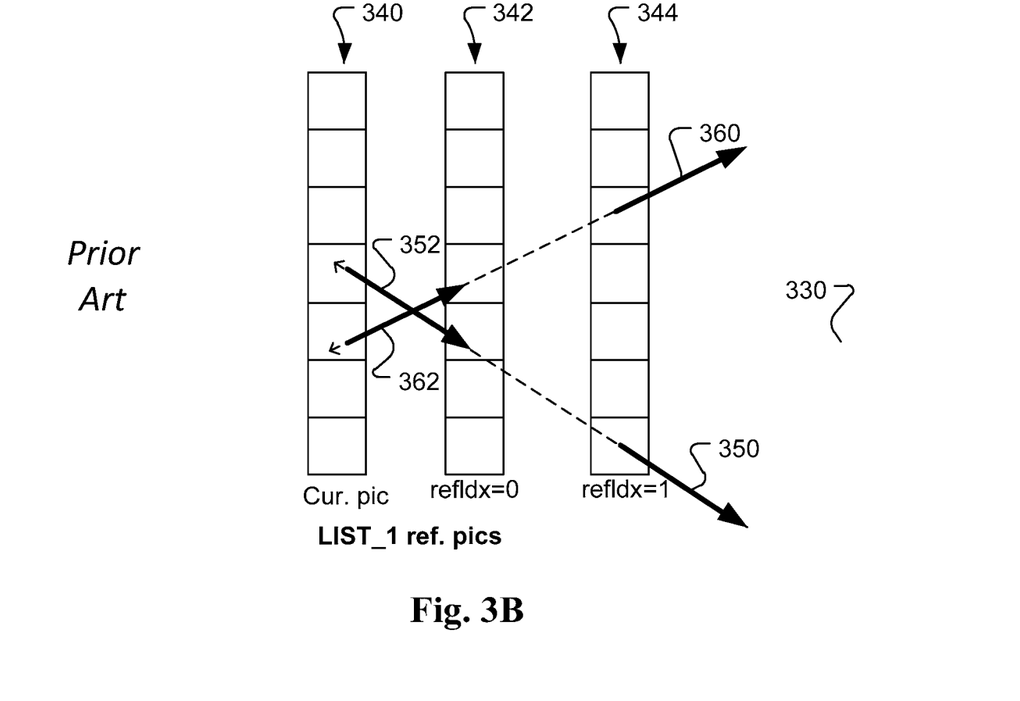
FIG. 3B illustrates an example of temporal motion vector prediction (MVP) derivation process for LIST_1 reference pictures.

In the decoder side MV derivation method, a new temporal MVP called temporal derived MVP is derived by scanning all MVs in all reference frames. To derive the LIST_0 temporal derived MVP, for each LIST_0 MV in the LIST_0 reference frames, the MV is scaled to point to the current frame. The 4×4 block that pointed by this scaled MV in current frame is the target current block. The MV is further scaled to point to the reference picture that refIdx is equal 0 in LIST_0 for the target current block. The further scaled MV is stored in the LIST_0 MV field for the target current block. FIG. 3A and FIG. 3B illustrate examples for deriving the temporal derived MVPs for List_0 and List_1 respectively. In FIG. 3A and FIG. 3B, each small square block corresponds to a 4×4 block. The temporal derived MVPs process scans all the MVs in all 4×4 blocks in all reference pictures to generate the temporal derived LIST_0 and LIST_1 MVPs of current frame. For example, in FIG. 3A, blocks 310, blocks 312 and blocks 314 correspond to 4×4 blocks of the current picture, List_0 reference picture with index equal to 0 (i.e., refidx=0) and List_0 reference picture with index equal to 1 (i.e., refidx=1) respectively. Motion vectors 320 and 330 for two blocks in List_0 reference picture with index equal to 1 are known. Then, temporal derived MVP 322 and 332 can be derived by scaling motion vectors 320 and 330 respectively. The scaled MVP is then assigned it to a corresponding block. Similarly, in FIG. 3B, blocks 340, blocks 342 and blocks 344 correspond to 4×4 blocks of the current picture, List_1 reference picture with index equal to 0 (i.e., refidx=0) and List_1 reference picture with index equal to 1 (i.e., refidx=1) respectively. Motion vectors 350 and 360 for two blocks in List_1 reference picture with index equal to 1 are known. Then, temporal derived MVP 352 and 362 can be derived by scaling motion vectors 350 and 360 respectively.

For the bilateral matching merge mode and template matching merge mode, two-stage matching is applied. The first stage is PU-level matching, and the second stage is the sub-PU-level matching. In the PU-level matching, multiple initial MVs in LIST_0 and LIST_1 are selected respectively. These MVs includes the MVs from merge candidates (i.e., the conventional merge candidates such as these specified in the HEVC standard) and MVs from temporal derived MVPs. Two different staring MV sets are generated for two lists. For each MV in one list, a MV pair is generated by composing this MV and the mirrored MV that is derived by scaling the MV to the other list. For each MV pair, two reference blocks are compensated by using this MV pair. The sum of absolutely differences (SAD) of these two blocks is calculated. The MV pair with the smallest SAD is selected as the best MV pair.

After a best MV is derived for a PU, the diamond search is performed to refine the MV pair. The refinement precision is ⅛-pel. The refinement search range is restricted within ±1 pixel. The final MV pair is the PU-level derived MV pair. The diamond search is a fast block matching motion estimation algorithm that is well known in the field of video coding. Therefore, the details of diamond search algorithm are not repeated here.

For the second-stage sub-PU-level searching, the current PU is divided into sub-PUs. The depth (e.g. 3) of sub-PU is signalled in sequence parameter set (SPS). Minimum sub-PU size is 4×4 block. For each sub-PU, multiple starting MVs in LIST_0 and LIST_1 are selected, which include the MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU.

For the template matching merge mode, the reconstructed pixels of above 4 rows and left 4 columns are used to form a template. The template matching is performed to find the best matched template with its corresponding MV. Two-stage matching is also applied for template matching. In the PU-level matching, multiple starting MVs in LIST_0 and LIST_1 are selected respectively. These MVs include the MVs from merge candidates (i.e., the conventional merge candidates such as these specified in the HEVC standard) and MVs from temporal derived MVPs. Two different staring MV sets are generated for two lists. For each MV in one list, the SAD cost of the template with the MV is calculated. The MV with the smallest cost is the best MV. The diamond search is then performed to refine the MV. The refinement precision is ⅛-pel. The refinement search range is restricted within ±1 pixel. The final MV is the PU-level derived MV. The MVs in LIST_0 and LIST_1 are generated independently.

For the second-stage sub-PU-level searching, the current PU is divided into sub-PUs. The depth (e.g. 3) of sub-PU is signalled in SPS. Minimum sub-PU size is 4×4 block. For each sub-PU at left or top PU boundaries, multiple starting MVs in LIST_0 and LIST_1 are selected, which include MV of PU-level derived MV, zero MV, HEVC collocated TMVP of current sub-PU and bottom-right block, temporal derived MVP of current sub-PU, and MVs of left and above PU/sub-PU. By using the similar mechanism as the PU-level searching, the best MV pair for the sub-PU is determined. The diamond search is performed to refine the MV pair. The motion compensation for this sub-PU is performed to generate the predictor for this sub-PU. For these PUs that are not at left or top PU boundaries, the second-stage sub-PU-level searching is not applied, and the corresponding MVs are set equal to the MVs in the first stage.

In this decoder MV derivation method, the template matching is also used to generate a MVP for inter mode coding. When a reference picture is selected, the template matching is performed to find a best template on the selected reference picture. Its corresponding MV is the derived MVP. This MVP is inserted into the first position in AMVP. AMVP represents advanced MV prediction, where a current MV is coded predictively using a candidate list. The MV difference between the current MV and a selected MV candidate in the candidate list is coded.

While the decoder-derived motion information method can reduce bitrate associated with signalling the motion information, the method tries out various motion vector candidates for various modes (e.g. FRUC modes, TMVP, AMVP, etc.) Such process not only causes high computational load, but also causes high system memory bandwidth due to the need of accessing reference data for various motion vector candidates and for various modes. Therefore, it is desirable to develop technique to reduce the memory bandwidth and/or computational loads.

SUMMARY

Method and apparatus of video coding using motion compensation are disclosed. According to one method of the present invention, an initial motion vector (MV) index is signalled in a video bitstream at an encoder side or determined from the video bitstream at a decoder side. A selected MV is then derived using bilateral matching, template matching or both to refine an initial MV associated with the initial MV index. A final MV or a final motion vector predictor (MVP) is determined from a set of MV candidates or MVP candidates including the selected MV. The current block or current MV of the current block is encoded or decoded using the final MV or the final motion vector predictor (MVP) at the encoder side or the decoder side respectively.

The initial MV index corresponds to a merge index used to select a merge MV candidate in one embodiment. Different codewords or different contexts may be used to code initial MV indices for different slice types. A pre-defined MV generation process can be used to derive a target MV and the initial MV index indicates the target MV. Furthermore, rate-distortion optimization (RDO) process can be used to select among the current motion-compensation process comprising said signalling the initial MV index and one or more other motion-compensation processes that select a second final MV or VP by trying out a set of starting motion vectors (MVs) without a need for signalling the initial MV.

In another method, a first and second MVs associated with a first and second reference lists are determined using template matching. If both the first and second MVs exist, costs associated with the first MV for uni-prediction, the second MV for uni-prediction and the first and second MVs for bi-prediction are evaluated. The mode (i.e., one of the two uni-prediction modes or the bi-prediction mode) with the smallest cost is selected as a candidate. If a first best template is found for one of the first reference list and the second reference list, the first best template can be used to search a second best template in the other of the first reference list and the second reference list. In this case, the current template can be modified to a modified current template corresponding to ((2×the current template)−the first best template) to search the second best template in the other of the first reference list and the second reference list. After the best second template is determined, the best second template is used to search the best first template for one of the first reference list and the second reference list in a next iteration.

According to yet another method, a best starting motion vector (MV) pair for bilateral matching merge mode or best starting motion vectors (MVs) for individual lists of template matching merge mode are determined. The best starting MV pair or the best starting MVs are refined by search within a search window around the best starting MV pair or the best starting MVs respectively. In one example, the range of search window depends on the block size of the current block. The current block may correspond to a coding unit (CU) or a prediction unit (PU). In one embodiment, the range of the search window is set to be a first range if the block size of the current block is equal to or larger than a threshold and the range of the search window is set to be a second range otherwise. For example, the threshold corresponds to 16×16, the first range corresponds to ±8, and the second range corresponds to ±4. In another example, the best starting MV pair and the best starting MVs are not refined, and no refined MV pair and no refined MVs are included in the set of MV candidates or MVP candidates.

According to yet another method, a merge candidate MV pair for a first reference list and a second reference list is derived using bilateral matching process or a first merge candidate MV and a second merge candidate MV for the first reference list and the second reference list are derived respectively using template matching process. A merge candidate list comprising three MV pairs corresponding to the merge candidate MV pair, the first merge candidate MV with a first mirrored MV in the second reference list, and the second merge candidate MV with a second mirrored MV in the first reference list are generated. A final MV or a final motion vector predictor (MVP) is determined from the merge candidate list.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In VCEG-AZ07, a method of decoder derived motion vector is disclosed, which include two Frame Rate Up-Conversion (FRUC) Modes. The motion vector derivation process according to VCEG-AZ07 is fairly complex and causes high computational load and high system memory bandwidth. Accordingly, various methods to reduce the required computational load and system memory bandwidth or to improve the coding efficiency are disclosed. Various embodiments according to the present invention are disclosed as follows.

As mentioned before, while the term FRUC refers to motion vector derivation for Frame Rate Up-Conversion, the underlying techniques are intended for a decoder to derive one or more merge MV candidates without the need for explicitly transmitting motion information. In other words, the FRUC is treated as a technique to generate decoder-derived motion vector(s). In particular, the derived MV can be included in a candidate list (such as but not limited to a merge candidate list). When the MV is selected, it can be used for coding a block or coding the motion information of the block.

Various methods to reduce the memory bandwidth and/or computations or to improve coding efficiency are disclosed as follows.

MV Pair of Merge Candidates for FRUC Modes

In the bilateral matching merge mode and template matching merge mode in VCEG-AZ07, the LIST_0 and LIST_1 MVs of a merge candidate are processed independently and placed into different MV lists. According to this method, the MV pair of merge candidates is used together. For example, for bilateral matching, the MVs in LIST_0 and LIST_1 are not necessary in the same motion trajectory. The MV pair in a merge candidate can be the starting LIST_0 and LIST_1 MVs for the bilateral matching merge mode. For template matching merge mode, the templates in LIST_0 and LIST_1 reference pictures are considered together according to the this embodiment. The bi-prediction compensations are applied to generate a reference template from both LIST_0 and LIST_1 templates according to a MV pair of merge candidates. The searching order for bilateral matching merge can be 1) LIST_0 MV and its mirrored MV; 2) LIST_1 MV and its mirrored MV; 3) LIST_0 and LIST_1 MV pair of merge candidates. The searching order for template matching merge can be 1) uni-prediction template with LIST_0 MVs; 2) uni-prediction template with LIST_1 MVs; 3) bi-prediction template with LIST_0 and LIST_1 MV pair of merge candidates. The orders can be switched.

Smallest-Cost L0 or L1 MV for Template Matching Merge Mode

In the template matching merge mode, the SAD cost of LIST_0 templates and LIST_1 templates are calculated separately. If both MVs in LIST_0 and LIST_1 exist, the MVs of the best templates in LIST_0 and LIST_1 are used to generate a bi-predicted reference block for coding. The method according to VCEG-AZ07 always uses a bi-predicted reference block for coding when both MVs in LIST_0 and LIST_1 exist. However, the uni-prediction or bi-direction ME is adaptively selected to generate the reference block according to the present method when both MVs in LIST_0 and LIST_1 exist. For example, if the best templates in LIST_0 and LIST_1 are found, but the un-predicted template in LIST_0 or LIST_1 has smaller cost than bi-predicted template, the uni-direction compensation is used to generate the reference block for template matching merge mode. In this case, an option to use a uni-prediction reference block is provided instead of being restricted to use bi-direction compensation when both MVs in LIST_0 and LIST_1 exist.

According to a variant of this method, when one or more best LIST_0/LIST_1 templates are found, the templates in one list (e.g. LIST_0/LIST_1) can be used to search the templates in the other list (e.g. LIST_1/LIST_0). For example, the current template can be modified as (2×(current template)−LIST_0 template). The new current template is used to search the best template in LIST_1. The iterative search can be used. For example, after the LIST_1 template is found, the current template can be modified as (2×(current template)−LIST_1 template). The modified new current template is used to search the best template in LIST_0 again. The number of iterations and the first target reference list can be defined.

Signalling Merge Index in Bilateral Matching and/or Template Matching Merge Mode In bilateral matching merge mode and template matching merge mode, the LIST_0 and LIST_1 MVs in merge candidates are used as starting MVs. The best MV is implicitly derived by searching all these MVs. It requires a lot of computations as well as memory bandwidth. According to the present method, the merge index for bilateral matching merge mode or template matching merge mode is signalled. The best starting MVs in LIST_0 and LIST_1 are known based on the signalled candidate index. The bilateral matching or template matching only needs to do the refinement search around the signalled merge candidate. In other words, the process of trying out all starting MVs to identify a best starting MV is skipped. Consequently, the associated computations as well as memory access are skipped. For bilateral matching, if the merge candidate is a uni-directional MV, its corresponding MV in another list can be generated by using the mirrored (scaled) MV.

According to this method, the merge index for the starting MV has to be signalled, which would require some overhead information. However, a rate-distortion optimization (RDO) process can be used selected a best starting candidate among the one with signalled merge index and others without a signalled merge index. The RDO process is well known optimization process, in particular for video coding. Therefore, the details of the RDO process are omitted in this disclosure.

A predefined MV generating method can be used to identify a best starting MV. The predefined MV generating method doesn't have to be the same as that disclosed in VCEG-AZ07. After the predefined MV generating process is applied, the starting MVs in LIST_0, LIST_1, and/or the MV pairs are known. The best starting MVs in LIST_0 and/or LIST_1, or the best MV pair are then explicitly signalled to reduce the bandwidth requirement. In another embodiment, the initial MV index can be inferred to be a predefined value for bilateral matching, template matching or both. The predefined value can be 0, however, the present invention is not limited thereto.

Reducing Number of Starting MVs

The more stating MVs, the more bandwidth are required. In order to reduce the bandwidth requirement, a method is disclosed to select one or partial starting MVs in a list by using the MV statistic or the decoded information (e.g. the residual). For example, the most frequently appeared MV, the center MV, and/or the median MV can be selected. In another example, the MVs can be classified into several groups (e.g. by using MV distance). One or more MVs are selected from a group to form the final stating MV list. In one embodiment, the merge MVs that from the blocks with large residuals can be dropped.

Modified Temporal Derived MVP

Figure 4:
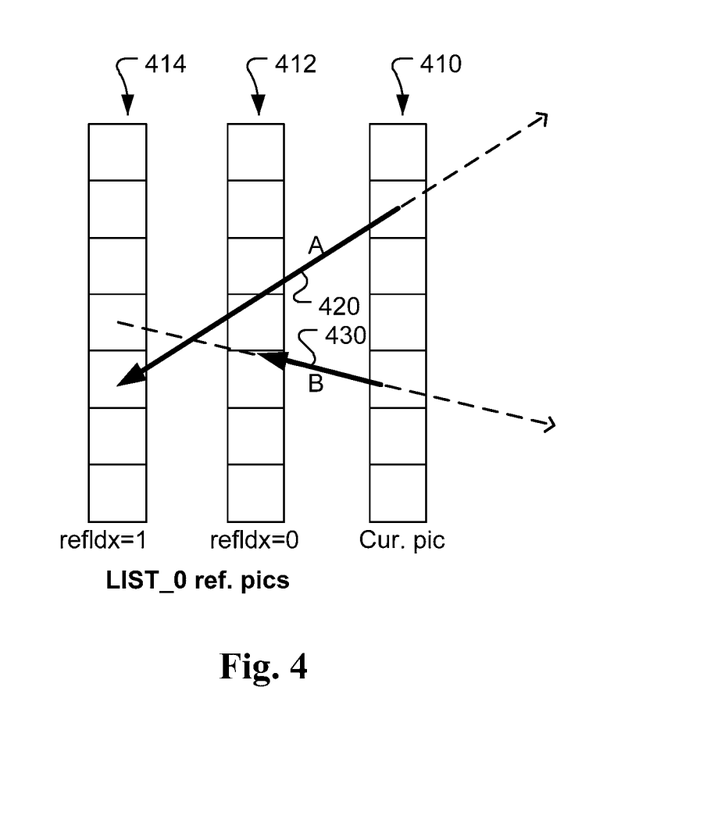
FIG. 4 illustrates an example of modified temporal motion vector prediction (MVP) derivation process according to one embodiment of the present invention, where the LIST_1 MVs in LIST_0 reference pictures are used to generate the LIST_0 temporal derived MVP.

In VECG-AZ07, to derive the LIST_0 temporal derived MVP, all LIST_0 MVs in all LIST_0 reference pictures are scanned and scaled to generate the MVPs. According to the present method, the LIST_1 MVs in LIST_0 reference pictures are used to generate the LIST_0 temporal derived MVP. For example, in FIG. 4, the LIST_1 MVs of LIST_0 reference pictures are used to derive the LIST_0 temporal MV of current picture. Blocks 410 correspond to blocks in the current picture. Blocks 412 and 414 correspond to blocks of LIST_0 pictures with refidx equal to 0 and 1 respectively. The LIST_1 MV or scaled MV in LIST_0 reference pictures is used to derive the crossed block in current picture. Then, the scaled MVP is calculated and assigned to the crossed block. The starting point of the stored MVP is the current picture, the end point of the MVP can be the original reference picture (e.g. MV A 420) or the reference picture with refidx equal to 0 (e.g. MV B 430). When multiple MVs need to be stored in the same current block, the MV that points to the nearest reference picture or the MV with the less movement can be stored.

Simplified Search Process

In the bilateral matching merge mode and template matching merge mode, there is one two-stage matching process. Since the best MV in the first stage is used as a predictor in the second stage, the search process in the first stage can be simplified according to the present method. For example, only the integer MVs are searched in the first PU-level stage and the fractional MVs are searched only in the second sub-PU-level stage. If there is no further sub-PU-level search for some sub PUs, then fractional MVs are searched in the first stage or derived from the neighbouring sub-PUs. In another embodiment, bilateral matching for sub-PU-level search can be applied in template matching merge mode. In the template matching merge mode, the second stage sub-PU-level searching is applied for those sub-PUs at left or top PU boundaries. For those sub-PUs that are not at left or top PU boundaries, the second stage sub-PU-level searching cannot be applied. In order to further improve this, it is proposed to utilize the bilateral matching for the second stage sub-PU-level searching in the template matching merge mode when bi-directional prediction is searched.

Constrained Sub-PU Motion Refinement

In this method, the sub-PU motion refinement can be modified according to relation between the LIST_0 and LIST_1 MVs. For example, if the LIST_0 and LIST_1 MVs do not comply with the linearity, the decoder does not apply sub-PU motion refinement. In another example, the decoder applies sub-PU motion refinement according to the direction of LIST_0 and LIST_1 MVs.

Reducing the Operations of Block Matching

Figure 5:
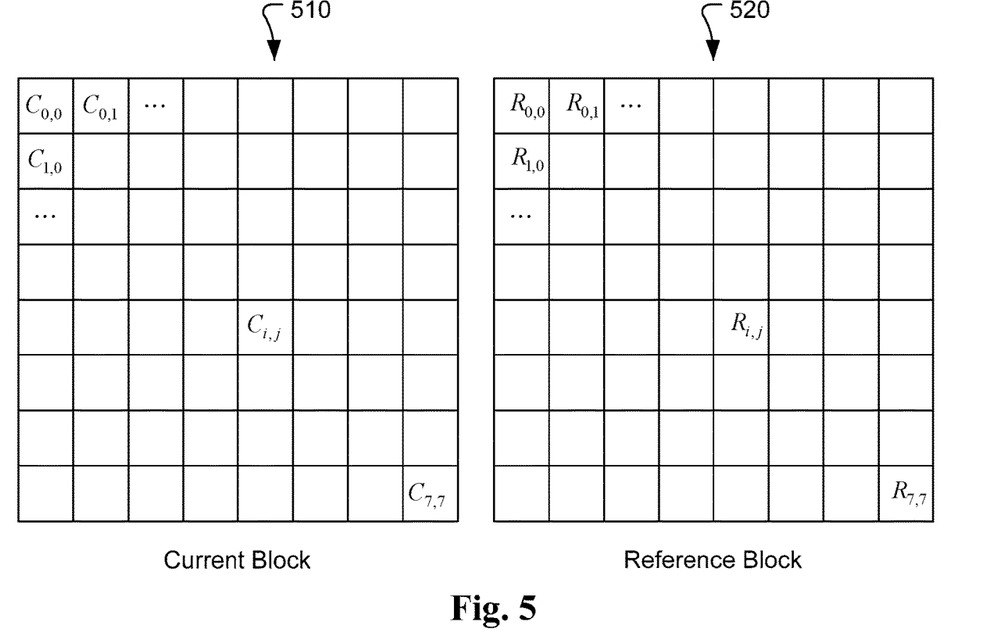
FIG. 5 illustrates an example of pixels in a current block and a reference block for calculating differences between the current block and the reference block.

For the decoder side MV derivation, the SAD costs of the template with various MVs are calculated to find a best MV at the decoder side. To reduce the operations for SAD calculation, a method to approximate the SAD between the current block 510 and the reference block 520 is disclosed. In the conventional SAD calculation for block matching, as shown in FIG. 5, the squared differences between corresponding pixel pairs of current block (8×8 block) and reference block (8×8 block) are calculated and summed up to obtain the final sum of the squared difference values as illustrated in Eq. (1), where $C_{i,j}$ and $R_{i,j}$ represent the pixels in current block 510 and in reference block 520 respectively, where the width equals to N and the height equals to M.

$$SAD = \sum_{(i,j)=(0,0)}^{(N,M)} \text{abs}(C_{i,j} - R_{i,j}) \quad (1)$$

Figure 6:
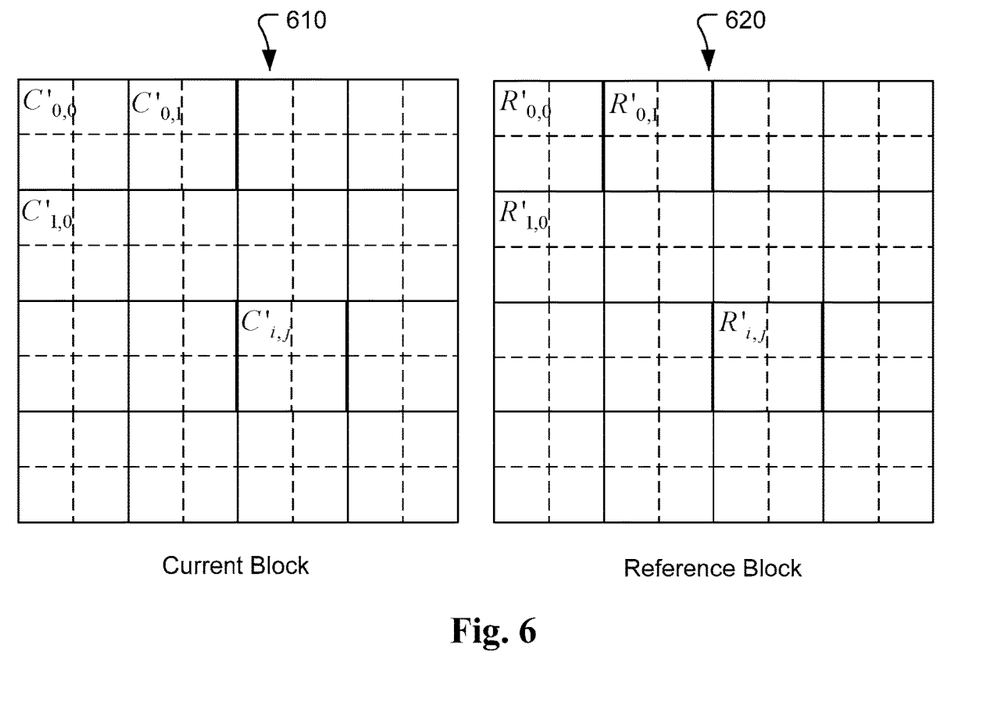
FIG. 6 illustrates an example of pixels in a current block and a reference block for calculating differences between the current block and the reference block according to an embodiment of the present invention, where sub-blocks with virtual pixel values are used to reduce the operations required for calculating the differences.

To speed up, the current block and reference block are divided into sub-blocks with size K×L, where K and L can be any integer numbers. As shown in FIG. 6, the current block 610 and reference block 620 are both 8×8 blocks and are divided into 2×2 sub-blocks. Each sub-block is then treated as a virtual pixel and uses a virtual pixel value to represent each sub-block. The virtual pixel value can be the sum of the pixels within the sub-block, the average of the pixels within the sub-block, the dominate pixel values within the sub-block, one pixel within the sub-block, one default pixel value, or any other means to calculate one value using the pixels within the sub-block. The sum of absolute difference (SAD) can be calculated as the sum of the absolute difference between virtual pixels of current block and reference block. Alternatively, the sum of the squared difference (SSD) can be calculated as the sum of the squared difference between virtual pixels of current block and reference block. Therefore, the per-pixel SAD or SSD is approximated by the SAD or SSD of virtual pixels, which requires much fewer operations (e.g. fewer multiplications).

Moreover, to retain similar search results, the present method also discloses a refinement search stage after M best matches are located using the SAD or SSD of virtual pixels, where M can be any positive integer. For each of the M best candidate, per-pixel SAD or SSD can be calculated to find the final best matching block.

MV Grouping

According to this method, the initial MVs to be searched are first classified into multiple sub-groups. A syntax element is first transmitted to the decoder to indicate which sub-group is selected. The bilateral matching merge mode and/or template matching merge mode is applied on the MVs within the selected sub-group only to find a best one. In one embodiment, the MVs are classified into two sub-groups: a first sub-group corresponding to spatial sub-group including all spatial MV candidates and the second sub-group corresponding to temporal sub-group including all the temporal MV candidates and/or the temporal derived MV. The encoder first transmits a syntax element (e.g. a flag) to the decoder to indicate whether the temporal sub-group or spatial sub-group is used for the bilateral matching merge mode and/or the template matching merge mode to derive a best MV.

Combined Template Matching and Bilateral Matching

According to this method, the template matching is used to get the best MV in LIST_0 or LIST_1. The best MV in LIST_0 or LIST_1 is then used to derive a compensated prediction block in LIST_0 or LIST_1. This compensated prediction block is used as the "current block" to find a best reference block in the other list (e.g LIST_1 for the best MV in LIST_0, or LIST_0 for the best MV in LIST_1). These two compensated prediction blocks in both lists are the predictors for the current block.

PMVD Size Constraint

To reduce the bandwidth and complexity, the block size dependent PMVD is disclosed. In one embodiment, if the block (CU or PU) area is smaller than (or equal to) N (e.g. 64), the PMVD is disabled. In another embodiment, if the block (CU or PU) area is smaller than (or equal to) M (e.g. 256), the search range of the PMVD is reduced to ±K (e.g. K=4). For the block size larger than M, the search range of the PMVD is set to be ±L (e.g. L=8). The above conditions can be applied together. The N, M, K, L can be signalled in the slice-level, picture-level, or sequence-level. For example, the N, M, K, and L can be signalled in slice-header, adaptive parameter set (APS), picture parameter set (PPS), or sequence parameter set (SPS).

Using Merge Candidates Only as the PU-Level Starting MV

To reduce the bandwidth and/or processing complexity, another method is disclosed that uses only the merge candidates as the starting searching candidates for PU-level starting MV.

Figure 7:
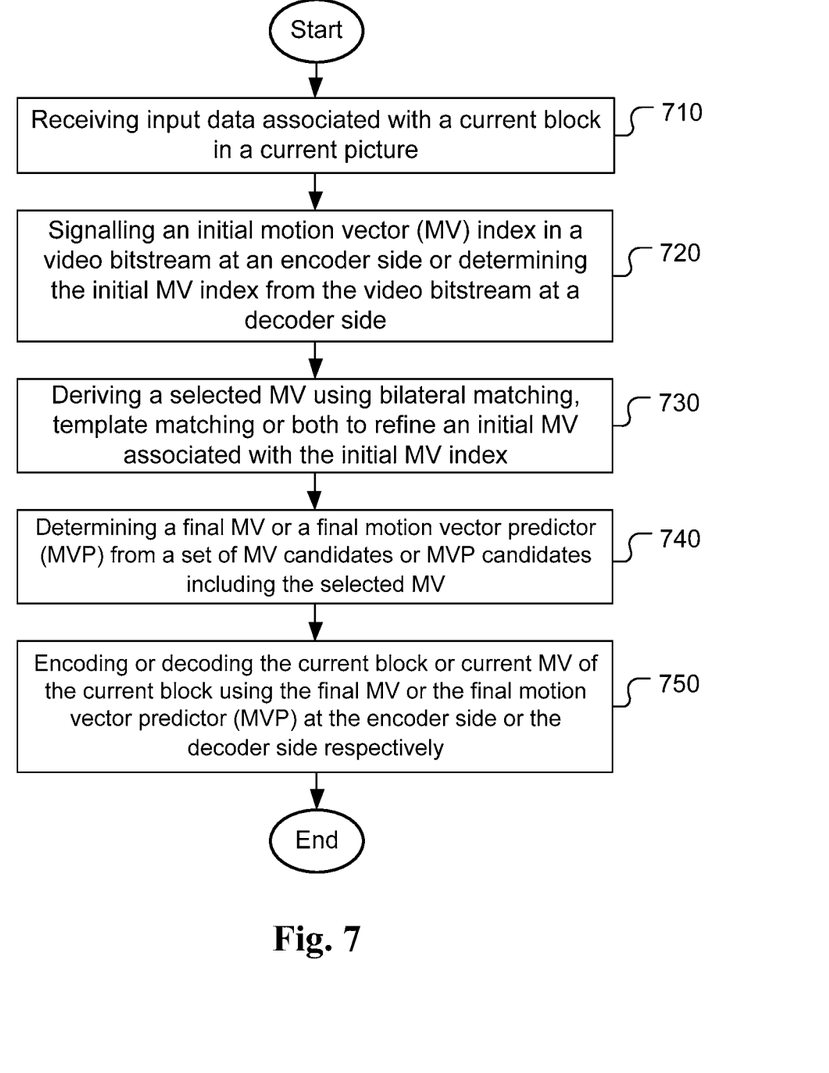
FIG. 7 illustrates an exemplary flowchart of a video coding system using decoder-derived motion information based on template matching according to an embodiment of the present invention, where an initial MV index is signalled to reduce the required computations.

FIG. 7 illustrates an exemplary flowchart of a video coding system using decoder-derived motion information based on template matching according to an embodiment of the present invention, where an initial MV index is signalled to reduce the required computations. According to this method, input data associated with a current block in a current picture is received in step 710. For encoding, the input data may correspond to the motion information of the current block (e.g. motion vector) or pixel data or residual data of the current block to be encoded. For decoding, the input data may correspond to the coded motion information of the current block (e.g. motion vector) or coded pixel data or residual data of the current block to be decoded. An initial motion vector (MV) index is signalled in a video bitstream at an encoder side or the initial MV index is determined from the video bitstream at a decoder side in step 720. A selected MV is derived using bilateral matching, template matching or both to refine an initial MV associated with the initial MV index in step 730. A final MV or a final motion vector predictor (MVP) is determined from a set of MV candidates or MVP candidates including the selected MV in step 740. The current block or current MV of the current block is encoded or decoded using the final MV or the final motion vector predictor (MVP) at the encoder side or the decoder side respectively in step 750.

Figure 8:
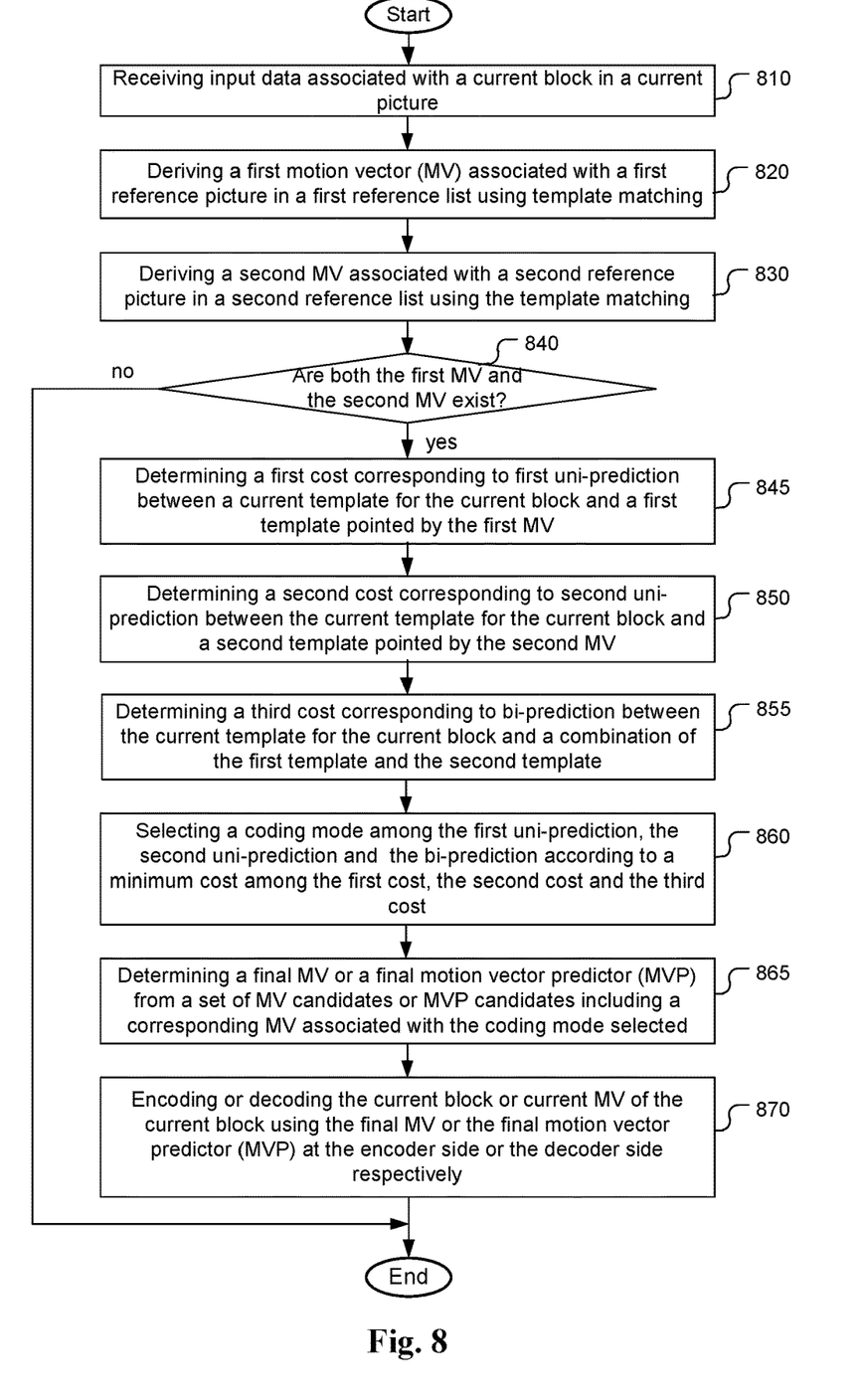
FIG. 8 illustrates an exemplary flowchart of a video coding system using decoder-derived motion information according to an embodiment of the present invention, where uni-prediction may be used if the uni-prediction results in a lower cost when the motion vectors for both reference lists exist.

FIG. 8 illustrates an exemplary flowchart of a video coding system using decoder-derived motion information according to an embodiment of the present invention, where uni-prediction may be used if the uni-prediction results in a lower cost when the motion vectors for both reference lists exist. According to this method, input data associated with a current block in a current picture is received in step 810. For encoding, the input data may correspond to the motion information of the current block (e.g. motion vector) or pixel data or residual data of the current block to be encoded. Again, for decoding, the input data may correspond to the coded motion information of the current block (e.g. motion vector) or coded pixel data or residual data of the current block to be decoded. A first motion vector (MV) associated with a first reference picture in a first reference list is derived using template matching in step 820. A second motion vector (MV) associated with a second reference picture in a second reference list is derived using template matching in step 830. Whether both the first MV and the second MV exist is checked in step 840. If the result is "yes", steps 845 through 870 are performed. Otherwise (i.e., the "no" path), steps 845 through 870 are skipped. In step 845, a first cost corresponding to first uni-prediction between a current template for the current block and a first template pointed by the first MV is determined. In step 850, a second cost corresponding to second uni-prediction between the current template for the current block and a second template pointed by the second MV is determined. In step 855, a third cost corresponding to bi-prediction between the current template for the current block and a combination of the first template and the second template is determined. In step 860, a coding mode is selected among the first uni-prediction, the second uni-prediction and the bi-prediction according to a minimum cost among the first cost, the second cost and the third cost. In step 865, a final MV or a final motion vector predictor (MVP) is determined from a set of MV candidates or MVP candidates including a corresponding MV associated with the coding mode selected. In step 870, the current block or current MV of the current block is encoded or decoded using the final MV or the final motion vector predictor (MVP) at the encoder side or the decoder side respectively.

Figure 9:
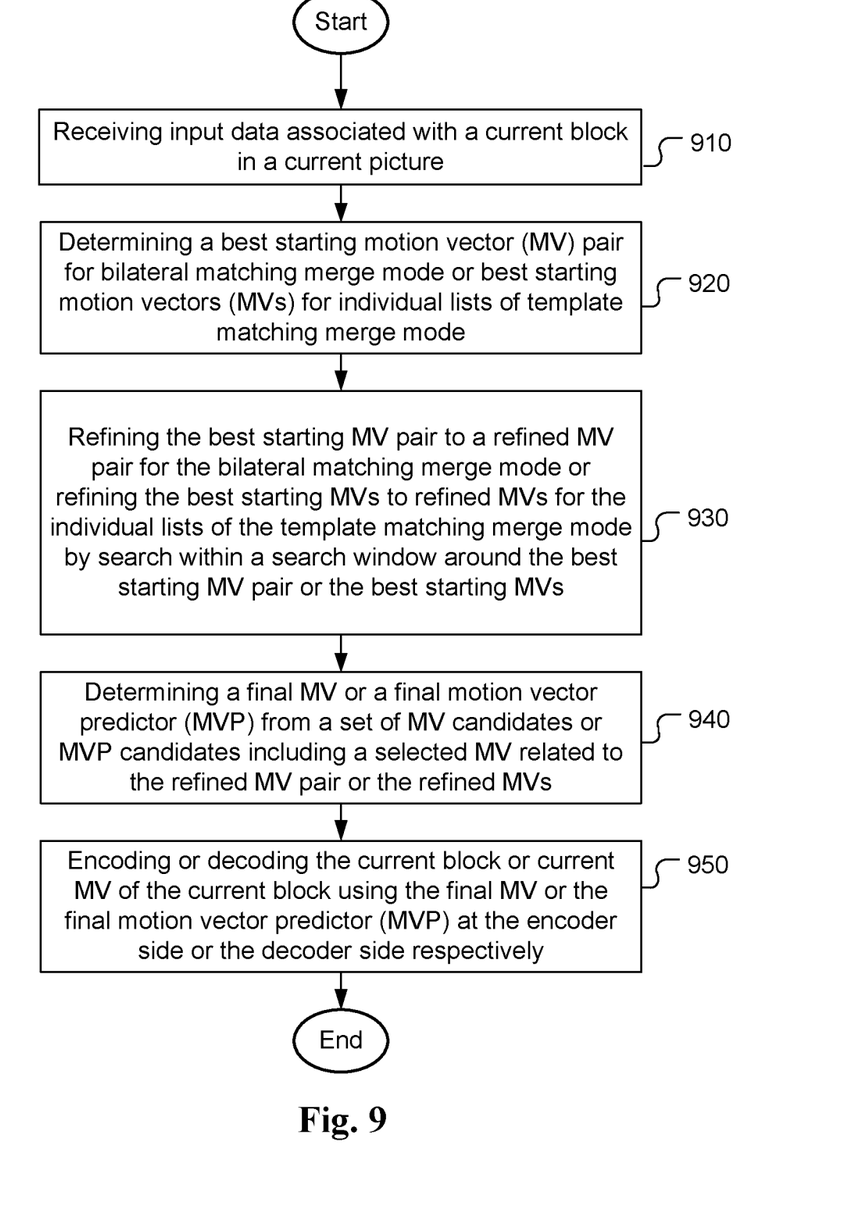
FIG. 9 illustrates an exemplary flowchart of a video coding system using decoder-derived motion information based on template matching according to an embodiment of the present invention, where motion vector refinement is reduced or restricted to reduce the required computations.

FIG. 9 illustrates an exemplary flowchart of a video coding system using decoder-derived motion information based on template matching according to an embodiment of the present invention, where motion vector refinement is reduced or restricted to reduce the required computations. According to this method, input data associated with a current block in a current picture is received in step 910. A best starting motion vector (MV) pair for bilateral matching merge mode or best starting motion vectors (MVs) for individual lists of template matching merge mode are determined in step 920. The best starting MV pair is refined to a refined MV pair for the bilateral matching merge mode or the best starting MVs is refined to refined MVs for the individual lists of template matching merge mode by search within a search window around the best starting MV pair or the best starting MVs in step 930. In one embodiment, a range of the search window depends on a block size of the current block. A final MV or a final motion vector predictor (MVP) is determined from a set of MV candidates or MVP candidates including a selected MV related to the refined MV pair or the refined MVs in step 940. The current block or current MV of the current block is encoded or decoded using the final MV or the final motion vector predictor (MVP) at the encoder side or the decoder side respectively in step 950.

Figure 10:
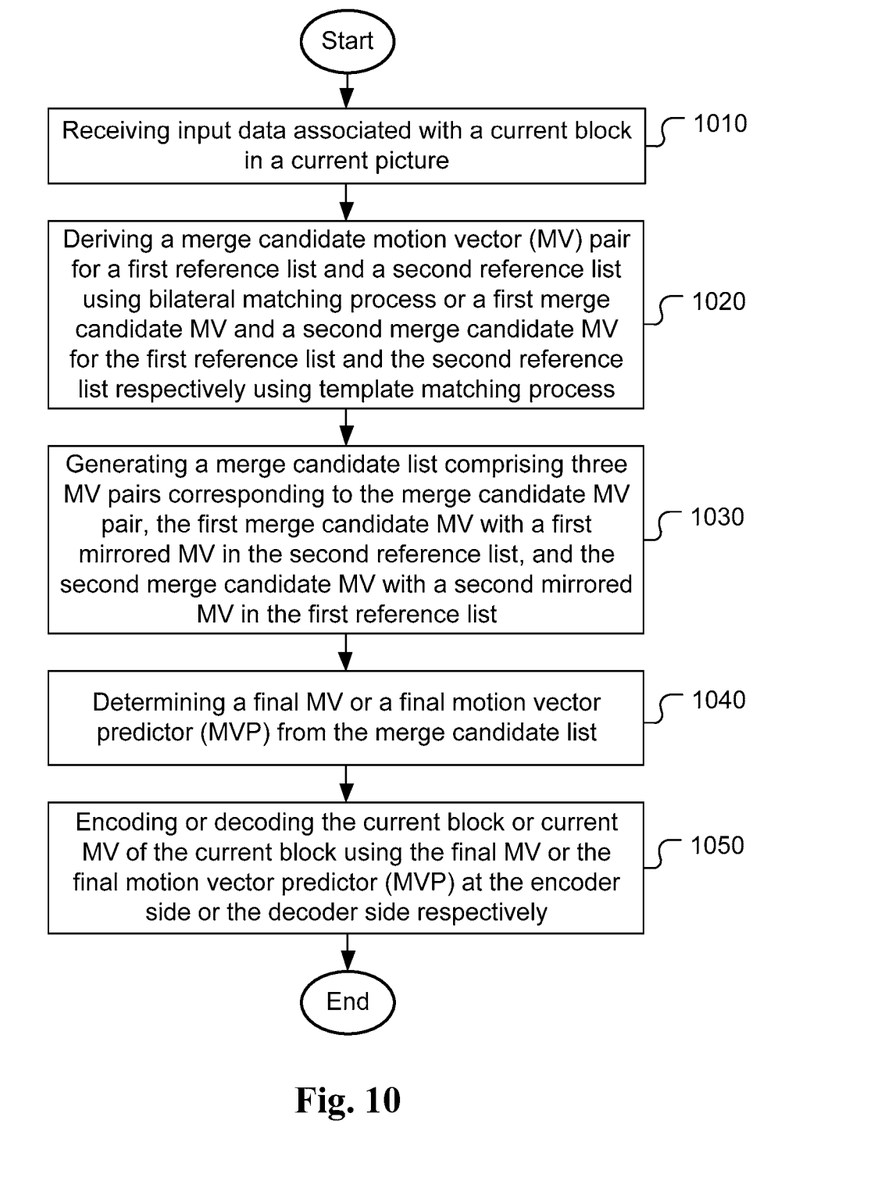
FIG. 10 illustrates an exemplary flowchart of a video coding system using decoder-derived motion information based on template matching according to an embodiment of the present invention, where merge candidate MV pair is used instead of splitting the MVs into two merge lists.

FIG. 10 illustrates an exemplary flowchart of a video coding system using decoder-derived motion information based on template matching according to an embodiment of the present invention, where merge candidate MV pair is used instead of splitting the MVs into two merge lists. According to this method, input data associated with a current block in a current picture is received in step 1010. A merge candidate motion vector (MV) pair for a first reference list and a second reference list is derived using bilateral matching process or a first merge candidate MV and a second merge candidate MV for the first reference list and the second reference list respectively are derived using template matching process in step 1020. A merge candidate list comprising three MV pairs corresponding to the merge candidate MV pair, the first merge candidate MV with a first mirrored MV in the second reference list, and the second merge candidate MV with a second mirrored MV in the first reference list is generated in step 1030. A final MV or a final motion vector predictor (MVP) is determined from merge candidate list in step 1040. The current block or current MV of the current block is encoded or decoded using the final MV or the final motion vector predictor (MVP) at the encoder side or the decoder side respectively in step 1050.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using motion compensation, the method comprising:
receiving input data associated with a current block in a current picture;
signalling an initial motion vector (MV) index in a video bitstream at an encoder side or determining the initial MV index from the video bitstream at a decoder side;
when a block size of the current block is greater than a threshold,
deriving a selected MV using bilateral matching, template matching or both to refine an initial MV associated with the initial MV index, a set of MV candidates or MVP candidates including the selected MV,
wherein when the block size of the current block is smaller than or equal to the threshold, the initial MV is not refined, and no refined MV is included in the set of MV candidates or MVP candidates;
determining a final MV or a final motion vector predictor (MVP) from the set of MV candidates or MVP candidates; and
encoding or decoding the current block or a current MV of the current block using the final MV or the final motion vector predictor (MVP) at the encoder side or the decoder side respectively.

2. The method of claim 1, wherein the initial MV index corresponds to a merge index used to select a merge MV candidate.

3. The method of claim 1, wherein a pre-defined MV generation process is used to derive a target MV list and the initial MV index indicates a target MV from the target MV list.

4. The method of claim 1, wherein the initial MV index is inferred to be a predefined value for bilateral matching, template matching or both.

5. The method of claim 4, wherein the predefined value is 0.

6. The method of claim 1, wherein a rate-distortion optimization (RDO) process is used to select among a current motion-compensation process comprising said signalling the initial MV index and one or more other motion-compensation processes that select a second final MV or a second final MVP by trying out a set of starting motion vectors (MVs) without a need for signalling the initial MV.

7. A method of video coding using motion compensation, the method comprising:
receiving input data associated with a current block in a current picture;
deriving a first motion vector (MV) associated with a first reference picture in a first reference list using template matching;
deriving a second MV associated with a second reference picture in a second reference list using the template matching;
if both the first MV and the second MV exist:
determining a first cost corresponding to a first uni-prediction between a current template for the current block and a first template pointed by the first MV;
determining a second cost corresponding to a second uni-prediction between the current template for the current block and a second template pointed by the second MV;
determining a third cost corresponding to a bi-prediction between the current template for the current block and a combination of the first template and the second template;
selecting a coding mode among the first uni-prediction, the second uni-prediction and the bi-prediction according to a minimum cost among the first cost, the second cost and the third cost;
determining a final MV or a final motion vector predictor (MVP) from a set of MV candidates or MVP candidates including a corresponding MV associated with the coding mode selected; and
encoding or decoding the current block or a current MV of the current block using the final MV or the final motion vector predictor (MVP) at an encoder side or a decoder side respectively.

8. The method of claim 7, wherein if a first best template is found for one of the first reference list and the second reference list, the first best template is used to search a second best template in another of the first reference list and the second reference list.

9. The method of claim 8, wherein the current template is modified to a modified current template corresponding to ((2× the current template)—the first best template) to search the second best template in said another of the first reference list and the second reference list, and wherein after the best second template is determined, the best second template is used to search the best first template for said one of the first reference list and the second reference list in a next iteration.

10. A method of video coding using motion compensation, the method comprising:
receiving input data associated with a current block in a current picture;
determining a best starting motion vector (MV) pair for a bilateral matching merge mode or best starting motion vectors (MVs) for individual lists of a template matching merge mode;
when a block size of the current block is greater than a first threshold,
refining the best starting MV pair to a refined MV pair for the bilateral matching merge mode or refining the best starting MVs to refined MVs for the individual lists of the template matching merge mode by search within a search window around the best starting MV pair or the best starting MVs, a set of MV candidates or MVP candidates including a selected MV related to the refined MV pair or the refined MVs,
wherein when the block size of the current block is smaller than or equal to the first threshold, the best starting MV pair and the best starting MVs, if available, are not refined, and no refined MV pair and no refined MVs are included in the set of MV candidates or MVP candidate;
determining a final MV or a final motion vector predictor (MVP) from the set of MV candidates or MVP candidates; and encoding or decoding the current block or a current MV of the current block using the final MV or the final motion vector predictor (MVP) at an encoder side or a decoder side respectively.

11. The method of claim 10, wherein the current block corresponds to a coding unit (CU) or a prediction unit (PU).

12. The method of claim 10, wherein a range of the search window depends on a block size of the current block, and the range of the search window is set to be a first range if the block size of the current block is larger than a second threshold and the range of the search window is set to be a second range otherwise.

13. The method of claim 12, wherein at least one of the second threshold, the first range and the second range is signalled in slice-level, picture-level, or sequence-level.

14. The method of claim 12, wherein the second threshold corresponds to 16×16, the first range corresponds to ±8, and the second range corresponds to ±4.

15. The method of claim 10, wherein if a block size of the current block is smaller than or equal to a third threshold, the bilateral matching merge mode and the template matching merge mode are disabled.

16. The method of claim 15, wherein the third threshold is signalled in slice-level, picture-level, or sequence-level.

17. An apparatus for video coding using motion compensation, the apparatus comprising one or more electronic circuits or processors arranged to:
receive input data associated with a current block in a current picture;
signal an initial motion vector (MV) index in a video bitstream at an encoder side or determining the initial MV index from the video bitstream at a decoder side;
when a block size of the current block is greater than a threshold,
derive a selected MV using bilateral matching, template matching or both to refine an initial MV associated with the initial MV index, a set of MV candidates or MVP candidates including the selected MV,
wherein when the block size of the current block is smaller than or equal to the threshold, the initial MV is not refined, and no refined MV is included in the set of MV candidates or MVP candidates;
determine a final MV or a final motion vector predictor (MVP) from the set of MV candidates or MVP candidates; and
encode or decode the current block or a current MV of the current block using the final MV or the final motion vector predictor (MVP) at the encoder side or the decoder side respectively.

18. An apparatus for video coding using motion compensation, the apparatus comprising one or more electronic circuits or processors arranged to:
receive input data associated with a current block in a current picture;
derive a first motion vector (MV) associated with a first reference picture in a first reference list using template matching;
derive a second MV associated with a second reference picture in a second reference list using the template matching;
if both the first MV and the second MV exist:
determine a first cost corresponding to a first uni-prediction between a current template for the current block and a first template pointed by the first MV;
determine a second cost corresponding to a second uni-prediction between the current template for the current block and a second template pointed by the second MV;
determine a third cost corresponding to a bi-prediction between the current template for the current block and a combination of the first template and the second template;
select a coding mode among the first uni-prediction, the second uni-prediction and the bi-prediction according to a minimum cost among the first cost, the second cost and the third cost;
determine a final MV or a final motion vector predictor (MVP) from a set of MV candidates or MVP candidates including a corresponding MV associated with the coding mode selected; and
encode or decode the current block or a current MV of the current block using the final MV or the final motion vector predictor (MVP) at an encoder side or a decoder side respectively.

19. An apparatus for video coding using motion compensation, the apparatus comprising one or more electronic circuits or processors arranged to:
receive input data associated with a current block in a current picture;
determine a best starting motion vector (MV) pair for a bilateral matching merge mode or best starting motion vectors (MVs) for individual lists of a template matching merge mode;
when a block size of the current block is greater than a threshold,
refine the best starting MV pair to a refined MV pair for the bilateral matching merge mode or the best starting MVs to refined MVs for the individual lists of the template matching merge mode by search within a search window around the best starting MV pair or the best starting MVs, a set of MV candidates or MVP candidates including a selected MV related to the refined MV pair or the refined MVs,
wherein when the block size of the current block is smaller than or equal to the threshold, the best starting MV pair and the best starting MVs, if available, are not refined, and no refined MV pair and no refined MVs are included in the set of MV candidates or MVP candidate:
determine a final MV or a final motion vector predictor (MVP) from the set of MV candidates or MVP candidates; and
encode or decode the current block or a current MV of the current block using the final MV or the final motion vector predictor (MVP) at an encoder side or a decoder side respectively.

\* \* \* \* \*

UNITED STATES PATENT AND TRADEMARK OFFICE
CERTIFICATE OF CORRECTION

PATENT NO. : 10,511,835 B2  
APPLICATION NO. : 15/754721  
DATED : December 17, 2019  
INVENTOR(S) : Tzu-Der Chuang et al.

Page 1 of 1

It is certified that error appears in the above-identified patent and that said Letters Patent is hereby corrected as shown below:

On the Title Page

Item (72) the 7th inventor's names should read:  
-- Tzu-Der Chuang, Zhubei (TW); Ching-Yeh Chen, Taipei (TW); Chih-Wei Hsu, Hsinchu (TW); Yu-Wen Huang, Taipei (TW); Jian-Liang Lin, Su'ao Township (TW); Yu-Chen Sun, Keelung (TW); Yi-Ting Shen, Taichung (TW) --

Signed and Sealed this  
Eighth Day of December, 2020

Andrei Iancu  
*Director of the United States Patent and Trademark Office*